United States Patent [19]

Cairns et al.

[11] 4,330,436

[45] May 18, 1982

[54] CATALYST SUPPORTS AND FLUID TREATMENT DEVICES

[75] Inventors: James A. Cairns, Wantage; John E. Antill, Harwell; Michael L. Noakes, Reading, all of England

[73] Assignee: United Kingdom Atomic Energy Authority, London, England

[21] Appl. No.: 179,825

[22] Filed: Aug. 20, 1980

Related U.S. Application Data

[63] Continuation of Ser. No. 916,829, Jun. 19, 1978, abandoned.

[30] Foreign Application Priority Data

Jun. 20, 1977 [GB] United Kingdom ............... 25747/77

[51] Int. Cl.$^3$ ........................ B01J 21/04; B01J 23/74; B01J 35/02
[52] U.S. Cl. ............................. 252/466 J; 252/477 R; 422/180
[58] Field of Search ........................ 252/466 J, 477 R; 422/177, 180, 188; 423/213.2, 213.5

[56] References Cited

U.S. PATENT DOCUMENTS

| | | | |
|---|---|---|---|
| 2,332,110 | 10/1943 | Podbielniak | 261/94 |
| 2,526,657 | 10/1950 | Guyer | 252/477 R |
| 2,801,906 | 8/1957 | Bratton | 252/477 R |
| 3,362,783 | 1/1968 | Leak | 252/477 R |
| 3,391,910 | 7/1968 | Prahl | 261/94 |
| 3,492,098 | 1/1970 | DePalma et al. | 252/477 R |
| 3,867,313 | 2/1975 | Brewer | 423/213.5 |
| 3,920,583 | 11/1975 | Pugh | 252/465 |

*Primary Examiner*—W. J. Shine
*Attorney, Agent, or Firm*—William R. Hinds

[57] ABSTRACT

A device for treating fluid, in particular a supported catalyst for motor vehicle exhaust gas purification. The device comprises a plurality of short helical lengths of smooth surfaced wire of aluminium containing iron based alloy wound to avoid self contact, coated with ceramic material and catalytically active material, and assembled together in a container having a gas inlet and a gas outlet.

4 Claims, 8 Drawing Figures

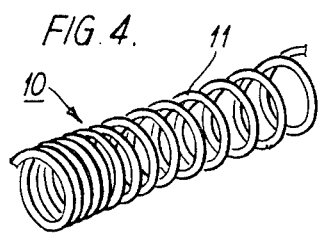
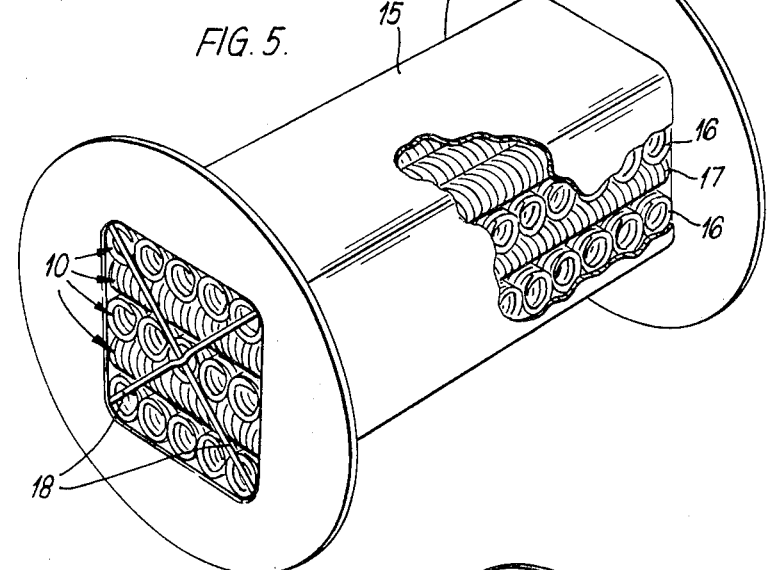
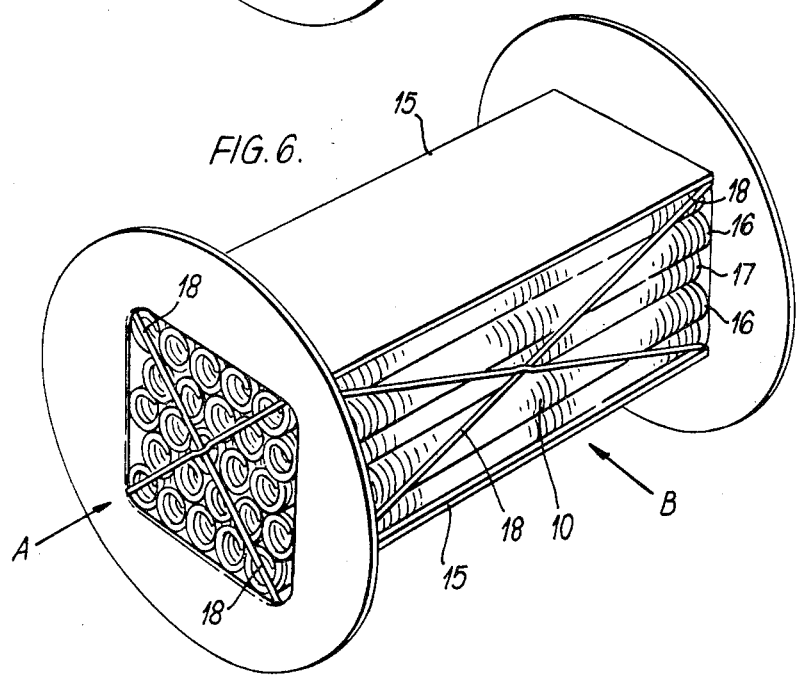

CATALYST SUPPORTS AND FLUID TREATMENT DEVICES

CROSS REFERENCES

This is a continuation of application Ser. No. 916,829, filed June 19, 1978, now abandoned.

Reference is made to U.S. Pat. No. 3,920,583 and U.S. patent applications Ser. No. 733,152 filed Oct. 18, 1976 and Ser. No. 733,153 filed Oct. 18, 1976, both now abandoned.

BACKGROUND OF THE INVENTION

The invention relates to catalyst supports and like devices for use in treatment of fluids by interaction with a solid surface. The invention is particularly concerned with catalyst supports for catalyst systems required to withstand a severe environment and repeated thermal cycling such as is met by a car exhaust treatment system.

U.S. Pat. No. 3,920,583 describes a catalyst system comprising an aluminium bearing ferritic steel substrate, an electrically insulating ceramic layer on a surface of said ferritic steel substrate, and a catalytic material supported upon the ceramic layer, said aluminium bearing steel substrate comprising an alloy of iron, chromium, aluminium, and yttrium, and having the property of forming an alumina layer on heating in air, said alumina layer protecting the steel substrate against further oxidation attack, and said ceramic layer comprising a layer of alumina formed by heating the aluminium bearing ferritic steel substrate in the presence of oxygen to cause the formation of a layer of alumina on the surface of the ferritic steel substrate from aluminium within the ferritic steel substrate, thereby forming a tenaciously adherent ceramic layer on said ferritic steel substrate.

U.S. Pat. No. 3,920,583 describes a substrate formed from the alloy into a cylindrical matrix which may be in the form of a wire bundle or may be formed from 0.0125 cm thick sheet corrugated and wound up, with an interleaved plane sheet, into a spiral.

SUMMARY OF THE INVENTION

We have now found that the concepts underlying the invention of U.S. Pat. No. 3,920,583 may be extended by selection and control of the configuration and surface coating of the substrate support. Thus, if the substrate is fabricated in wire form in a particular openwork three dimensional configuration, defined more fully below, by which contact between adjacent wires or parts of wire is avoided at least until after surface coating has been carried out, and if the wire surface is smooth and substantially free from discontinuity (except at the ends), as for example in a wire having circular cross-section, then a number of important advantages follow. In particular, a high degree of high temperature corrosion resistance can be achieved so that, for example, a substrate of aluminium bearing ferritic alloy without the yttrium addition can give satisfactory performance and durability in the severe environment of a motor vehicle exhaust catalyst.

The configuration referred to above also provides for efficient coating of the alloy substrate with porous ceramic material both as a coating which protects the alloy and as a support for catalytic material.

We have further appreciated that these advantages, whilst of principal significance in the manufacture and use of supported catalysts for satisfactory performance and durability in the catalytic purification of exhaust gases from motor vehicles, also have significance in any system (whether involving catalysis or not) where fluids are to be treated by passage over and interaction with a solid surface, and control of the above mentioned parameters is important.

Accordingly, the present invention provides a method of manufacturing a device for the catalytic purification of exhaust gases of an internal combustion engine, which method comprises forming short lengths of wire of an aluminum containing, iron based alloy with a smooth surface free between its ends from edges or sharp corners, winding the short lengths of wire into short helical coil components in which contacts between adjacent turns of the wire in the helical coil are avoided, contacting the components with a dispersion in a liquid medium of a refractory material and separately or simultaneously contacting the components with a dispersion in a liquid medium of catalytic material or material convertible into a catalytic material, the components being shaken after contact with the liquid dispersion to remove excess liquid, followed by drying and firing, and assembling the components in a container having inlet and outlet gas passageways. In one preferred embodiment, the short lengths of wire are corrugated into a smooth curved corrugated form prior to winding into a helical coil, whereby the space between adjacent turns of the helical coil components varies as a consequence of the corrugation. Also in a preferred embodiment, the peaks of the corrugation of each winding are arranged to coincide with peaks in the next adjacent winding, and thus serve to prevent nesting of adjacent coiled members.

Also according to the invention, a method of manufacturing a device for use in treatment of a fluid by passing fluid over a solid surface with which the fluid interacts, comprises fabricating aluminum bearing, iron based alloy into at least one component of wire form shaped into a bent wire having a three-dimensional configuration in which the surface of the wire is substantially smooth and free between its ends from edges or sharp corners and contacts between adjacent wires or parts of wires are avoided, contacting the component or components with a dispersion in a liquid medium of a material convertible on subsequent drying and firing into a ceramic, shaking to remove excess liquid, drying and firing the component or components to provide a surface layer of ceramic material on the wire, and assembling the component or components in a container having fluid inlet and outlet passageways. In one preferred version, the three-dimensional configuration comprises a helical coil, and the wire is corrugated into a smooth curved corrugated form prior to formation into a helical coil, whereby the space between adjacent turns of the helical coil varies as a consequence of the corrugation, and the peaks of the corrugation of each winding are arranged to coincide with peaks in the next adjacent winding, thus serving to prevent nesting of adjacent coiled components.

The ceramic layer preferably comprises porous ceramic material applied to the alloy surface and bonded thereto by heat treatment. The ceramic layer may include alumina formed on the surface of the alloy from aluminium from within the alloy by heat treatment of the alloy in the presence of oxygen. Such alumina formation may be carried out at least partially before applying the porous ceramic material which itself preferably comprises alumina. Where, as is preferred, heat treatment to bond the porous ceramic material to the alloy is carried out in the presence of oxygen, then alumina forming from aluminium within the alloy, either as an initial such formation or an additional formation where pre-oxidation treatment has been applied, will grow into and assist in bonding the porous ceramic material.

The invention includes a device manufactured as aforesaid for use in the catalytic treatment of a fluid, wherein catalytic material is deposited upon the or each said component. Preferably the device comprises a plurality of said components with catalytic material deposited thereon assembled together in a container having a gas inlet and a gas outlet, whereby the container can be connected into the exhaust system of an internal combustion engine to effect catalytic purification of the exhaust gases. The catalytic material may be deposited either after pre-coating of the substrate alloy with porous ceramic material or may be deposited simultaneously with the porous ceramic material.

A preferred configuration for the individual supports is a helical coil as described and claimed in commonly assigned U.S. application Ser. No. 916,561, filed on the same day (June 19, 1978) as this application and claiming priority from British Patent Application No. 25746/77.

Metal alloys suitable for use in the present invention may be found within the alloy specification of a composition by weight of 10 to 30%; Cr, 1 to 10% Al, 0 to 0.5% C, and the balance Fe.

The preferred metal is an aluminium bearing ferritic alloy available under the UK Registered Trade Mark FECRALLOY. Where resistance to high temperature embrittlement is important such alloys are made within the specification of a composition by weight of up to 20% Cr, 1 to 10% Al, 0.1 to 3.0% Y and the balance Fe. Where a degree of high temperature embrittlement can be tolerated, as for example where a helical coiled wire configuration is employed, higher chromium content up to 25% by weight may be employed. The particularly preferred composition is a FECRALLOY (UK Registered Trade Mark) alloy having 15.50 to 16.50% Cr, 4.6 to 5.6% Al, 0.3 to 1.0% Y and the balance Fe.

The above mentioned alloys may include additions of Co and/or Ni and it is envisaged that such inclusions should be limited to the range 0 to 3% by weight of each element. However, acceptable performance may be achieved with these additions in the range 0 to 5% Co, and 0 to 5% Ni.

An alternative alloy is that sold under the UK Registered Trade Mark KAMTHAL DSD. A typical example of such an alloy has an approximate composition by weight of 22.5% Cr, 4.5% Al, 2.0% Co, 0.1% C and the balance Fe.

Preferably the aluminium bearing alloy has a ceramic layer on its surface. Preferably the ceramic material is bonded to the surface of the wire-form by heat treatment. The ceramics may comprise alumina, ceria, yttria, refractory metal oxides, silicas including gel glasses. As indicated above the preferred ceramic comprises alumina.

Embodiments of the present invention will now be described, by way of examples, with reference to the accompanying drawings in which FIGS. 1, 2 and 4 illustrate three components for use in a catalyst device constructed in accordance with the present invention.

FIGS. 5 and 6 illustrate two catalyst devices made from a number of components of the type shown in FIGS. 1, 2 or 4, arranged relative to one another to define a body through which a fluid to be treated can flow.

In the following embodiment of the invention the final product is to be used for the treatment of the exhaust gases of internal combustion engines by catalysis. It is to be understood however that the catalyst devices of the present invention may be useful in other industrial processes requiring supported catalytically active material.

Figure 1:
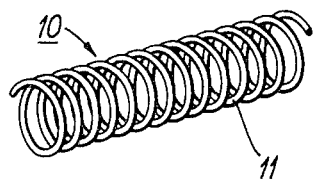

Referring to FIG. 1, there is shown a component comprising a helical coil 10 made from a 0.040 ins (1.0 mm) diameter circular section wire 11 wound along an axis to form a coil which measures 3.0 ins (76.2 mm) long × 0.25 ins (6.4 mm) outside diameter. The pitch of the windings is approximately 0.039 ins (1.0 mm).

The wire is made of FECRALLOY alloy (U.K. Registered Trade Mark) having a composition (by weight) of 4.6 to 5.6% Al, 15.50 to 16.50% Cr, 0.3 to 1.0% Y, and the balance Fe. A predominantly alumina layer is formed on the surface of the wire and a catalyst is deposited on the alumina layer as described in commonly assigned co-pending cognate U.S. patent application Ser. Nos. 733,152 and 733,153 both filed Oct. 18, 1976. In a particular example described in the specification accompanying the latter mentioned applications suitable for use in manufacturing catalyst devices of the present invention, alumina, prepared by a vapour condensation method, is formed into a sol by admixture with water and the sol mixed with a solution of yttrium nitrate in water to form a "mixed sol". A platinum salt is added to the mixed sol to constitute a dispersion which is applied to a preoxidised Fecralloy alloy substrate. The thus coated substrate is subsequently fired to provide a coating containing platinum as the catalytically active material. Other techniques of applying a catalyst to the coil 10 may be used.

Figure 2:
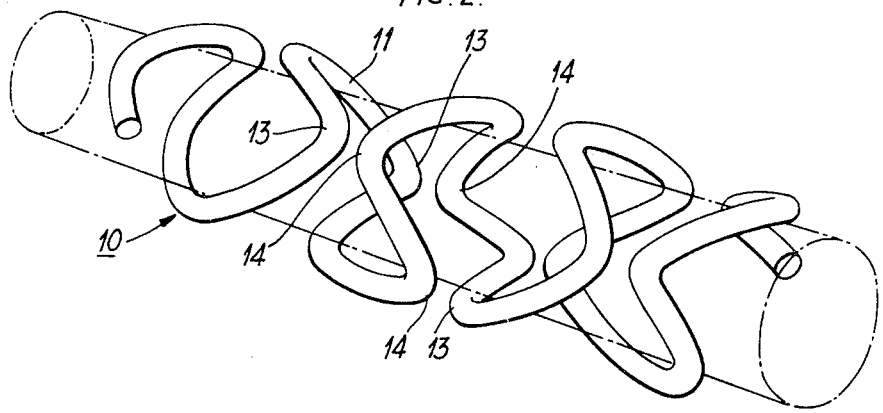
Figure 3:
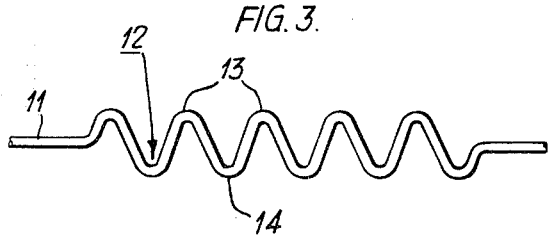
FIG. 3 illustrates the wire-form used to produce the components of FIG. 2.

Referring to FIG. 2 there is shown an alternative form of coiled wire-form manufactured from the same type of alloy wire 0.02 ins (0.5 mm) diameter and wound into a coil 0.125 ins (3.0 mm) diameter by 1.5 ins (40 mm) long with a pitch of 0.11 ins (2.8 mm). The wire, used to make the coil 10 of FIG. 2 is shown in FIG. 3. From FIG. 3 it will be seen that the wire 11 has superimposed along its length a corrugation 12 prior to it being wound into a coil. The corrugation 12 has a pitch of typically 0.13 ins (3.5 mm) and the dimension measured from peak to peak 14 is typically 0.04 (1.0 mm). The corrugation 12 imparts strength to the thin wire 11 and also if the peaks 13, 14 of the corrugation 12 of each winding are arranged to coincide with peaks 13, or 14 in the next adjacent winding serve to prevent nesting of adjacent coiled members. Here again a surface coating and a catalytically active material applied to the wire 11 in exactly the same way as described in connection with FIG. 1.

The components shown in FIGS. 1 and 2 may be of uniform pitch as shown in FIGS. 1 and 2 or the pitch may vary along the length of the coil as shown in FIG. 3. In the case of the component shown in FIG. 2, the pitch of the corrugations may be altered so that the peaks 13, 14 of each winding coincide.

Referring to FIGS. 5 and 6, a number of coils 10 of type shown in FIGS. 1 to 4 are assembled into a suitable holder 15 to form different catalyst devices. For example, in FIG. 5 a number of layers 16, 17 of coils 10 are employed. The longitudinal axis of each coil 10 in each layer 16, 17 extend in a common direction, but each layer 16 is arranged relative to adjacent layers 17 so that the longitudinal axes of the coils 10 of each layer 16 are at an angle to the longitudinal axes of the coils 10 in adjacent layers 17. Wires 18 are used to prevent the coils falling out of the holder 15.

In FIG. 6, all the coils 10 are assembled into a holder 15 with their longitudinal axes extending in a common direction. The cross-sectional shape of the holder 15 may be rectangular (as shown) or circular, eliptical or any other shape that will accommodate the coils 10. The fluid to be treated is arranged to flow in a direction substantially parallel to the longitudinal axes of the coils 10 (arrow A) as shown. Alternatively, a different holder 15 may be used that allows the fluid to be treated to flow normal to the longitudinal axes of the coils 10.

Wires 18 are employed to retain the bundle of coils 10 in the holder 15 in the catalyst device of FIGS. 5 and 6.

If desired, instead of laying up a plurality of coils 10 to form the catalyst device shown in FIGS. 5 or 6, one or more long lengths of coil, of the type shown in FIGS. 1, 2 or 4 may be folded onto itself to produce a similar layered effect.

Figure 7:
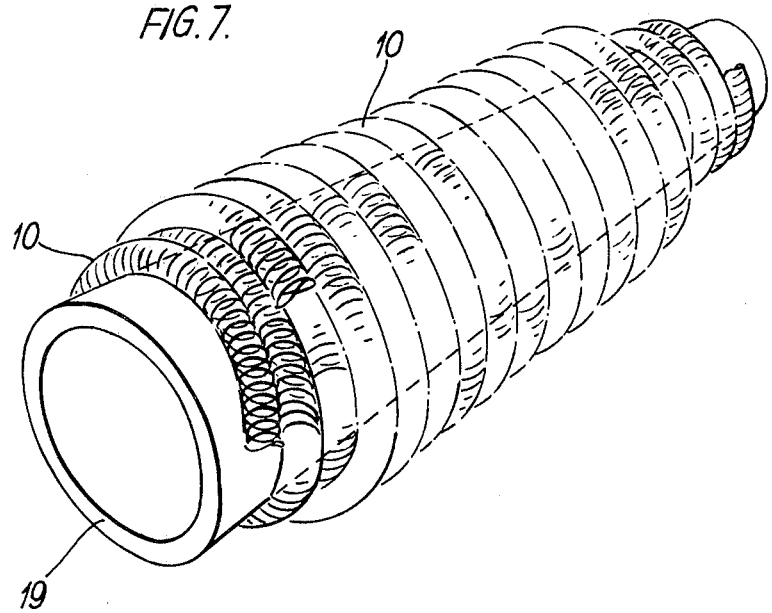
FIGS. 7 and 8 illustrate two further forms of catalyst device made from a single component similar to that shown in FIGS. 1, 2 or 4.
Figure 8:
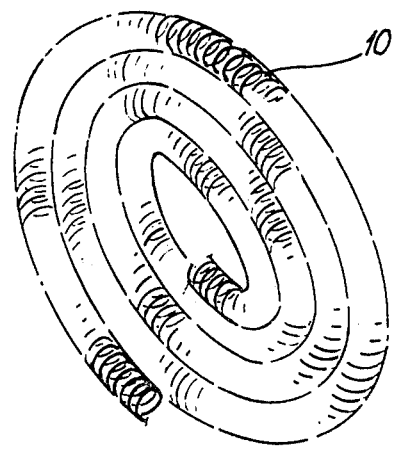

A continuous length of coiled wire such as illustrated in any one of FIGS. 1, 2 or 4 may be wound on itself to form a catalyst device. Two examples of such a device are shown in FIGS. 7 and 8. The catalyst device of FIG. 7 is formed by winding the coiled member 10 onto a spool or former 19 to produce one or more layers. The catalyst device of FIG. 8 is formed by winding the coiled member 10 into a spiral form. A number of spirally wound layers may be stacked side-by-side to form a complete catalyst system.

Instead of assembling a plurality of coils 10 of the type shown in FIGS. 1, 2 and 4 in an ordered fashion as shown in FIGS. 5 and 6, the coils may be poured randomly into a container. Specifically, Fecralloy alloy wire 0.010 ins (0.25 mm) diameter is wound into a coil of overall diameter 0.107 ins (2.7 mms) and of a continuous length. The coil so formed is then chopped to produce coils having a length of 0.25 ins (6.4 mm) and a plurality of the coils are poured into an open ended container, or ducting, having a fine mesh at one end. The container, or ducting may be of any shape. The container may be shaken to ensure that the coils settle in the container and form a fluid permeable body and when the container is filled with the chopped coils a second wire mesh is provided to retain the coils in the container. In operation the exhaust gases to be treated are caused to flow through the fluid-permeable body so formed.

Preferably the coils 10 of the catalyst devices of FIGS. 5 to 8, have a surface coating and a catalyst applied to them prior to assembly into the holder 15. In some cases it may be possible to coat them after they are assembled in the holder 15.

The diameter of the wire 11 and size of the coils 10 (i.e. length, diameter and pitch of the coil) may be varied to suit any particular process. In particular, these parameters can be varied to meet desired pressure-drop specifications for the intended use of the catalyst device. By varying these parameters one effectively varies the total effective surface area available to support a catalyst.

Preferably the cross-sectional shapes of the bore of the coils is a circle, although it may be of any desired shape, such as for example, triangular, rectangular, or polygonal achieved by winding the wire-form helically along a suitably shaped former. The terms "helical" and "helically" as used herein is taken to embrace coils wound along an axis irrespective of the shape of the bore of the coil. The coils may be formed on a conventional spring winding machine. The coils may be of uniform diameter or tapered if desired.

Catalyst devices constructed according to the present invention are useful in the treatment of exhaust gases of internal combustion engines by catalysis and in particular for trapping and treating soot products in the exhaust gases of diesel engines by catalysis, and the catalytic reduction of nitrogen oxides and catalytic oxidation of hydrocarbons and carbon monoxide in engine exhaust gases.

An important advantage that results from making the catalyst devices in the form of a number of coils is that one can apply different catalytically active materials to different coils if one so desires. For example, one can construct a composite catalyst device using two or more sets of identical coils assembled to form a body with different catalytically active materials deposited on each set of coils. For example a catalyst device similar to that shown in any of FIGS. 5 to 8 may be constructed with some of the coils carrying one metal from the platinum group of metals (platinum, osmium, iridium, palladium, rhodium, ruthenium) whilst the others carry a different metal from the platinum group.

In a specific example, a catalyst device constructed in accordance with the present invention for the treatment of exhaust gases of an internal combustion engine by catalysis may have some coils coated with platinum and the others coated with rhodium. In the past it has been usual to put down the platinum and rhodium as a common coating with platinum sites closely adjacent the rhodium sites. We have observed that after prolonged use the platinum becomes less effective at catalysing the oxidation of the hydrocarbons. Examination of the surface of the catalyst reveals that active platinum sites are lost, but we have found that this loss does not occur to the same extent when the rhodium and platinum are deposited on separate coils.

Tests involving the oxidation of propane were carried out by flowing a slug of propane/oxygen carried in a nitrogen stream over two types of supported catalyst. One supported catalyst was a Pt/Rh mixed catalyst on a ceramic coated FECRALLOY alloy substrate (shown as Catalyst A below), the other comprised separate Pt and Rh catalysts on separate coiled members made of ceramic coated FECRALLOY alloy assembled to constitute a common catalyst (shown as Catalyst B below). The catalyst volume was displaced 100,000 times per hour by the propane/oxygen slug. The results are shown below.

| Type of supported catalyst (see text) | Temperature required for 100% oxidation of propane | |
|---|---|---|
| | New catalyst | Catalyst after heating in air at 1,000° C. for 12 hours |
| A | 350° C. | 500° C. |

| Type of supported catalyst (see text) | Temperature required for 100% oxidation of propane | |
|---|---|---|
| | New catalyst | Catalyst after heating in air at 1,000° C. for 12 hours |
| B | 400° C. | 400° C. |

It is thought that the problem of the deterioration of the efficiency of the platinum as a catalyst may also apply to the commercial production of nitric acid from ammonia where platinum and rhodium are used as the catalysts. Therefore a catalyst bed made up of two sets of coils, each set of which either carries platinum or rhodium may be useful in the production of nitric acid.

The present invention may of course be useful in a wide variety of chemical processes involving treatment of fluids by interaction with a solid surface.

We claim:

1. A method of manufacturing a device for the catalytic purification of exhaust gases of an internal combustion engine, which method comprises forming short lengths of wire of an aluminium containing, iron based alloy with a smooth surface free between its ends from edges or sharp corners, corrugating the short lengths of wire into a smooth curved corrugated form and then winding the short lengths of wire into short helical coil components whereby the space between adjacent turns of the helical coil components varies as a consequence of the corrugation, the peaks of the corrugation in each turn being arranged to coincide with peaks in the next adjacent turn to serve to prevent nesting of adjacent helical coil components, and contacts between adjacent turns of the wire in the helical coil being avoided, contacting the components with a dispersion in a liquid medium of a refractory material and separately or simultaneously contacting the components with a dispersion in a liquid medium of catalytic material or material convertible into a catalytic material, the components being shaken after contact with said liquid dispersion to remove excess liquid, followed by drying and firing, and assembling the components in a container having inlet and outlet gas passageways.

2. A method of manufacturing a device for use in treatment of a fluid by passing fluid over a solid surface with which the fluid interacts, which method comprises fabricating aluminum bearing, iron based alloy wire into at least one helical coil component having a smooth surface free between its ends from edges or sharp corners, and in which contacts between adjacent wires or parts of wires are avoided, the wire being corrugated into a smooth curved corrugated form prior to formation into a helical coil, whereby the space between adjacent turns of the helical coil varies as a consequence of the corrugation, the peaks of the corrugation of each turn being arranged to coincide with peaks in the next adjacent turn, thus serving to prevent nesting of adjacent helical coil components, contacting the component or components with a dispersion in a liquid medium of a material convertible on subsequent drying and firing into a ceramic, shaking to remove excess liquid, drying and firing the component or components to provide a surface layer of ceramic material on the wire, and assembling the component or components in a container having fluid inlet and outlet passageways.

3. A method as claimed in claim 2 wherein the ceramic material surface layer is porous.

4. A method as claimed in claim 2 wherein catalytic material is deposited upon the surface layer of ceramic material on the components or each component.

* * * * *